US006480270B1

(12) United States Patent
Studnicka et al.

(10) Patent No.: US 6,480,270 B1
(45) Date of Patent: Nov. 12, 2002

(54) METHOD FOR MONITORING OBJECTS OR AN OBJECT AREA

(75) Inventors: Nikolaus Studnicka, Vienna; Andreas Ullrich, Gablitz, both of (AT)

(73) Assignee: Riegl Laser Measurement Systems GmbH, Horn (AT)

( * ) Notice: Subject to any disclaimer, the term of this patent is extended or adjusted under 35 U.S.C. 154(b) by 0 days.

(21) Appl. No.: 09/623,958

(22) PCT Filed: Mar. 4, 1999

(86) PCT No.: PCT/IB99/00371

§ 371 (c)(1),
(2), (4) Date: Sep. 8, 2000

(87) PCT Pub. No.: WO99/46614

PCT Pub. Date: Sep. 16, 1999

(30) Foreign Application Priority Data

Mar. 10, 1998 (AT) ................................. 411/98
Oct. 8, 1998 (AT) ................................. 1681/98

(51) Int. Cl.⁷ .......................... G01B 11/26; G01C 3/08; G09G 5/00
(52) U.S. Cl. .................. 356/141.1; 356/5.01; 345/113; 345/115
(58) Field of Search ............................ 356/141.1, 5.01, 356/4.01, 5.04; 345/113, 115

(56) References Cited

U.S. PATENT DOCUMENTS

| | | | |
|---|---|---|---|
| 5,200,793 A | * | 4/1993 | Ulich et al. |
| 5,361,217 A | | 11/1994 | Makimura et al. |
| 5,418,608 A | * | 5/1995 | Caimi et al. ............... 356/3.01 |
| 5,485,009 A | * | 1/1996 | Meyzonnetie et al. ..... 356/5.09 |
| 5,528,354 A | | 6/1996 | Uwira |
| 5,644,386 A | | 7/1997 | Jenkins et al. |
| 5,682,229 A | * | 10/1997 | Wangler .................... 356/4.01 |

FOREIGN PATENT DOCUMENTS

| | | |
|---|---|---|
| AT | 41198 | 3/1998 |
| AT | 405105 | 5/1999 |
| WO | 9711353 | 3/1997 |

OTHER PUBLICATIONS

Christie S et al: "Design and Development of a Multi-Detecting Two-Dimensional Rangingsensor", Measurement Science and Technology, vol. 6, No. 9, Sep. 1, 1995, pp. 1301–1308, XP000528786.

* cited by examiner

Primary Examiner—Stephen C. Buczinski
(74) Attorney, Agent, or Firm—Martin A. Farber

(57) ABSTRACT

A laser-based target detection system applicable to search and rescue operations takes into account a plurality of optical attributes in the energy delivered to, and received from, a target-containing area. In addition to analyzing the returned optical signature for sufficient energy reflected by a potential target at a primary laser wavelength, the system also senses the target's effect on a supplemental optical attribute. Only when sufficient amplitude at the primary wavelength is detected in conjunction with a substantial effect on the supplemental optical attribute is a valid target confirmed. The supplemental optical attribute can be amplitude at a wavelength other than the primary wavelength, with the system looking for a high degree of attenuation at the non-primary wavelength, or polarization. with the system preferably looking for change of orientation in the return optical signature. The system includes scan head chassis (102) for transmitting energy to a target-containing area, electronic chassis (104) for processing the received optical energy, laser pulse drive (106), and laser cooler (108).

39 Claims, 3 Drawing Sheets

METHOD FOR MONITORING OBJECTS OR AN OBJECT AREA

FIELD AND BACKGROUND OF THE INVENTION

The invention relates to a method for monitoring objects or an object area. An optoelectronic rangefinder has been provided which comprises a transmission device for transmitting optical signals which latter term should be understood in the broadest sense as an electromagnetic radiation either in the visible or invisible range. This rangefinder determines values of distance either from pulse timing (in a more narrow sense) or the phase relationship (Doppler system) of the transmitted optical signal, thus being a pulse timing rangefinder in the broader sense.

SUMMARY OF THE INVENTION

With such a method, it is an object of the present invention to enlarge and to improve its applicability in various practical fields. Such a method in accordance with the invetion is especially suited for fields of use, such as recording a scene of an accident or the surrounding of a criminal deed, but also for surveying objects or object spaces. A further field of use is recording cultural assets, such a buildings, or changes of an environment. The further values, which are assigned to the distance values, may be values of amplitude or passive image signals obtained from a beam splitter postponed to the scanner, or measuring values of an earlier measurement which values are combined with the actual measuring values, particularly in order to be able to discern changes of range-finder images (e.g. over time).

Just in the latter field, there will be very little change over time which is difficult to discern. The same difficulty in discerning results from movements of structures which cannot be detected visually or optically due to their contrast which is little or absent at all, as for example snow fields or scree slopes, but also in badly illuminated rooms to be surveyed. The invention with features thereof overcomes these special problems. A combination can be an additive or multiplicative one or the like, but suitably is effected by forming the difference.

The subject matter of this embodiment of the invention is to be seen in that after first scanning the object range and evaluating its data, they are stored in a memory as a reference set of data, and the sets of data of subsequent scannings are combined with the reference set of data, a differential set of data preferably being superimposed to the reference set of data or to the actual set of data, particularly in coded form, and are displayed and put out as an image on a monitor. Such a method may be used in alarm systems, on the one hand, and may serve the protection against burglary or other unauthorized intrusion or for discovering assassination attempts by deposing explosives. On the other hand, this method is able to visualize changes which develop at very slow rates, such as slides of mountain slopes or waste dumps as well as settlement phenomena in a terrain.

Applying this embodiment of the method according to the invention in alarm installations has the advantage over the well-known use of video systems that illumination of the object or object space is not necessary so that the fact of the surveillance cannot be recognized by an intruder. Moreover, the method according to the invention is insensitive to a large extent against attempts of deceiving or manipulating it, because it does not compare the structure of a surface, but rather three-dimensional images.

Certainly, known devices using a method of the above-identified type produce a so-called distance image on the screen of a monitor which indicates the respective distances from the surveying unit by mock colors. Such a distance image is a very suitable representation in many applications giving a good overview of objects distributed in depth. Of course, ouch distance image cannot or not clearly resolve structures which do not have any spatial depth at all or only a small one. For this reason, the method according to the prior art could not be applied for saving evidence after traffic accidents, because important elements of evidence, such as skid marks, splinters and other smaller parts of a car as well as marks applied by an officer to the road could not be dissolved in the distance image. Therefore, the situation after a traffic accident is usually still measured manually, e.g. by a perambulator, and is photographically recorded.

It has also been suggested to carry out measurements of an accident situation by means of a laser rangefinder first measuring points from a position the localities of which are indicated in maps or road maps, e.g. of buildings, traffic signs and so on, and then the cars involved in the accident and other objects relevant for the accident event. If with this method or with the purely manual one or other measurement has not been made, it is generally difficult, or even impossible, to determine precisely the position of certain objects afterwards.

A further disadvantage of the two methods described above is that they are extremely time consuming so that the place of an accident is blocked for a long period, thus resulting in severe traffic jams. All these special problems are solved in a simple manner by features of the invention.

Due to shading by individual objects in the space to be taken, a single recording cannot, in general, provide a complete three-dimensional information of this space. Therefore, at least two recordings are preferably made of substantially the same space from different angles of view. When subsequently evaluating the image, several identical points in the different images are marked so that an electronic calculator can generate a complete set of three-dimensional data upon the following image processing from the data of the different images. Thus, it is possible upon later evaluation to show pictures of the scene taken under any angle of view desired on a screen or print, and in particular it is possible to output a bird's-eye view, a perspective or a parallel projection so that the evaluating officer obtains automatically a representation of the recorded space similar to an aerial photograph. Since the space coordinates to each point of the recorded space exist as a reference in the set of three-dimensional data, important image elements can be marked, e.g. by a cursor on a computer screen, in addition to a graphical display, optionally in correct scale, and the space coordinates of a point and/or the distance to any other marked point can be issued.

According to this variant of the method, generally two or three recordings are made of a place of accident. Immediately after recording and, optionally, a first control of data, the place of accident can be cleared and clearance be given for the traffic, because all sorts of evaluations and measurements can be carried from the recorded data out later.

An apparatus for carrying out the method according to the invention as provided. Using one or more high sensitive photoreceivers, it is possible to record a the scene of an accident or the like even in darkness without any expensive illumination.

BRIEF DESCRIPTION OF THE DRAWINGS

Further characteristics of the invention will become apparent from the various subclaims and the description of an embodiment making reference to the figures of the drawings in which:

DETAILED DESCRIPTION OF THE PREFERRED EMBODIMENTS

Figure 1:
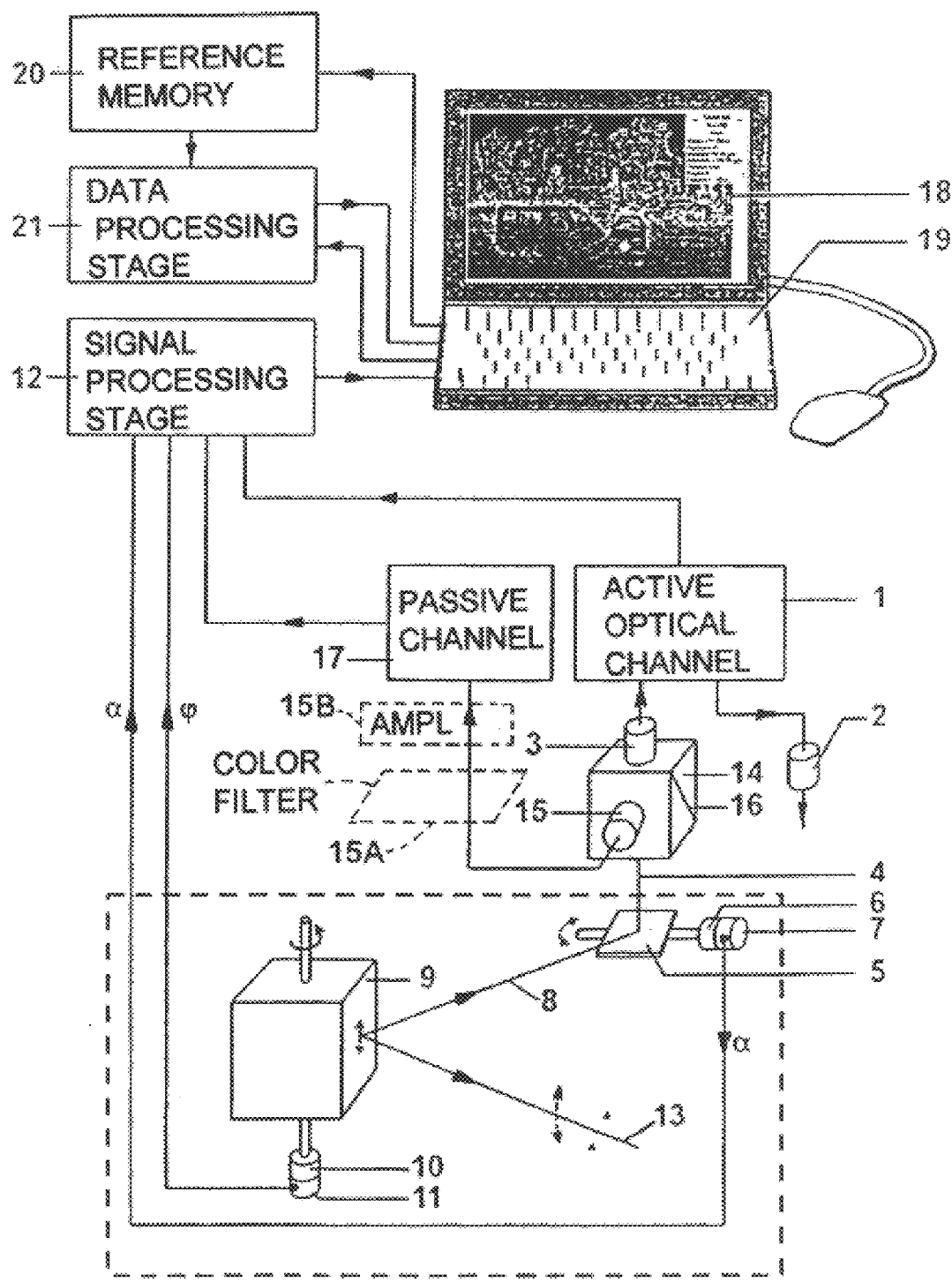
FIG. 1 shows schematically, partly as a block diagram, an apparatus according to the invention.

The apparatus according to FIG. 1 comprises an active optical channel 1 which consists substantially of a laser range-finder. The active channel comprises a transmitter diode 2 as well as a receiver diode 3. By the transmitter diode, a sequence of extremely short laser pulses are transmitted which are reflected by objects located in the target area. The beam reflected towards the recording apparatus is received by the receiver diode 3. From the transit time or the phase relationship of the laser pulses, the distance to the respective object is determined within the laser rangefinder or the active channel 1. An optical scanning system is mounted up-stream of each of the transmitter diode 2 and the receiver diode 3. For the sake of a clear representation, only the scanning device for the receiver diode 3 is illustrated and described as follows.

A beam 4 impinging on the receiver diode 3 over an optical axis of the same reference numeral is deflected, for example, by a sweeping mirror 5 driven by an actor 6. An angle sensor 7, that is connected to the actor 6, outputs a signal σ which depends on the position of the mirror 5. The beam 8 transmitted by the sweeping mirror 4 impinges on a mirror surface of a mirror prism 9 along the optical axis 8 which is driven at a high speed by a motor 10. The respective angular position of the mirror prism 9 is measured by a sensor 11; corresponding signals φ are fed to a signal processing stage 12. By moving the mirror 4 and the prism 9, the object space is linearly scanned by a beam 13 along a further optical axis.

The scanning arrangement for the transmitter diode is constructed analogously and scans the object space synchronously and with the same phase relationship in both directions so that the beam 13 and the corresponding beam of the transmitter arrangement are substantially parallel. Advantageously, the two movable optical elements 4 and 9 for the transmitter channel and the receiver channel use the same driving elements 6 and 10. It may be convenient to extend the mirror 4 and the prism 9 in axial direction so that the transmitter channel and the receiver channel may even make use of the same transmission devices. According to another embodiment of the invention, the laser rangefinder including its transmitter optics and receiver optics together with the rotating mirror prism could be combined to a fixed unit which is pivoted as a whole for scanning the object space.

By the active channel 1 (laser rangefinder) in combination with the scanning arrangement, the object space is scanned, a distance value being determined in conjunction with each space direction defined by the values of the angle sensors 7 and 11. The corresponding set of data, consisting of the image coordinates and the assigned distance value, is fed to a signal processing or evaluation stage 12, which is formed as a processor or calculator and, suitably, is provided with assigned memories, which generates a so-called distance image from the data, that is displayed on a monitor 18, by a printer (e.g. a color printer) or by any other image producing device. The distance image can be issued either in gray tints or in mock colors, a gray scale or a color scale being assigned to a distance scale. In addition, the distance of an image element or its space coordinates can be displayed directly by clicking it on.

In addition to the distance image, an amplitude image can be obtained from the active channel in which the amplitude of the reflected laser pulses received by the receiver arrangement is assigned to each image element, independently of its distance value. Since such an image shows structures in surfaces of the same distance, the evaluation of the images is substantially simpler, above all if an distance image is superimposed to an amplitude image.

Still more favorable is it if the object space, concurrently with the active channel, is scanned for a passive channel. Such an apparatus is illustrated in the drawings and is described in detail as follows:

A beam divider prism 14 is arranged within the path of rays of the beam 4 between the sweeping mirror 5 and the receiver diode 3, the beam divider prism providing part of the incident radiation to a second photodiode 15. Advantageously, the photodiode 15 has a different spectral sensitivity as compared with the diode 3 the spectral sensitivity of which is adapted to the transmitter diode 2. It may be suitable to use one diode for a long-wave infrared in order to achieve better penetration of fog. For other applications, a photodiode for the visible spectral range may be used. Instead of a single photodiode, a triple of photodiodes being sensitive for the three basic colors may be used. The spectral sensitivity may be adjusted by color filters (such as a color filter 15A shown in phantom) or dichroic mirrors mounted upstream, as known per se. Advantageously, the beam divider prism (splitter) 14 too has a dichroic mirror surface 16 through which the radiation of the laser diode 2 can pass substantially unimpeded, while radiation for which the diode 15 shows a maximum sensitivity is optimally reflected.

In order to be able to employ sech an apparatus also in darkness without any additional illumination, an image amplifier 15B (indicated in phantom), as is known per se, may be situated upstream, or a photo receiver of high sensitivity may be used instead of a photodiode, as is the case in the present embodiment.

The signals derived from the photodiode 15 or the respective photoreceiver, as a whole, describe a passive image of the object space which is congruent with the distance image, but, in terms of illumination, is independent of the laser light of the transmitter diode.

The signals are processed in the stage 17, called "passive channel" and are supplied to the signal processing stage 12 in which now not only a distance information exists, but also a luminance information and optionally a chrominance information assigned to each point which is defined by the sensors 7 and 11. These latter informations are first stored in memories of the stage 12. Then the data are further processed in the stage 12.

The output signals of the signal and data processing stage are supplied to a control and display unit 19 and 18. The data both of the active channel and the passive channel can be displayed as an image, optionally in a mock color technique, preferably superimposed on a monitor. By appropriate commands, certain distance images or sequences of distance images can be selected and stored in a reference data memory 20. The data of a distance image stored in the reference memory 20 are combined with actual distance image data, i.e. subtracted or superimposed, in a data processing stage 21 and are then switched through by the control unit 19.

In the present embodiment, a differential image is produced containing only those image elements the position and/or distance of which has changed in comparison with the reference image. In order to be able to facilitate assigning this differential image to the object space, it is recommended to superimpose it preferably to the reference distance image or to an assigned amplitude image or to a reference image derived from the passive channel. The differential image is preferably coded, e.g. in mock colors, and is superimposed to a gray scale reference image. In an advantageous manner, mock color coding is effected so that an approaching object, with increasing change of distance, is shown in an intensifying red, with an enlarging distance, however, in an intensifying blue. The manner of coding the differential image and superimposing it over a further image to be defined can be determined by the control unit 19 which controls the stage 21 accordingly.

The mode of operation of this embodiment of the method according to the invention is discussed in detail as follows:

When the installation has been made operative, a distance image is first produced by the laser rangefinder scanner and is displayed on the monitor 18. By the control unit 19, any desired reference image may be defined and stored in the memory 20. Further parameters, such as scanning frequency, threshold values for the automatic surveillance of the differential images and so on, may be defined by the control unit. It is also possible to actualize the reference image automatically so as to cut deliberately any slow change out of the display. In operation, the actual set of data supplied by the laser rangefinder scanner is compared with the set of data stored in the memory 20. The differential set of data, thus produced, is either displayed on a monitor as an image and/or is processed by the control unit 19 to a characteristic magnitude using a defined algorithm. The latter is compared with a boundary value to be defined. Upon exceeding the boundary value, an alarm is automatically released. In this way, it is possible to operate such an installation even without any human assistance.

When applied in security systems, the particular advantage of this method resides in that it is very flexible, on the one hand: for, upon stirring the alarm installation up, the object space is recorded by the laser rangefinder scanner, and this image is stored as a reference. Each change of this spatial image is either displayed or releases an alarm. On the other hand, the system is totally insensitive against changing conditions of the environment, such as conditions of illumination, and, above all, it is safe against any attempt of deceit, camouflage and so on, because an intruder dressed in black, for example, is visually not perceptible in front of a black background, but very well in a distance image, because he changes the three-dimensional structure of the object space.

However, the system is suited also for surveying objects which show hardly any contrast or lack contrast at all, such as a snowy or scree field, an avalanche stretch or a mudflow stretch and so on. It is an advantage of this system that it is also suited to detect very slowly developing changes, such as sliding terrain and settlement phenomena in which changing illumination conditions and vegetation, generally, do also not affect the measurement results.

Figure 2:
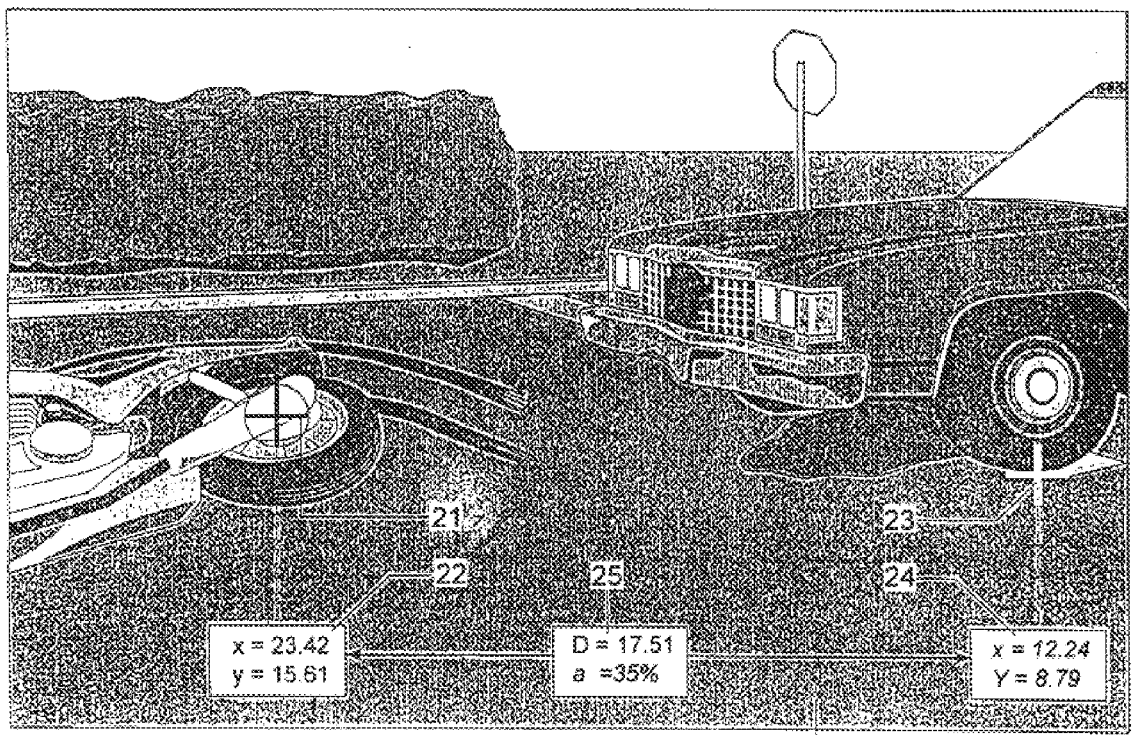
FIG. 2 by way of example, an image generated by the novel apparatus.

FIG. 2, by way of example, represents a monitor image 20' of an accident scene as a further embodiment. When "clicking" a first object 21' on, the spatial coordinates of this object can be displayed in a coordinate system to be defined. If a second point 23 is "clicked on", in addition to its coordinates 24, the distance from point 21' and, optionally also its direction (relative to the coordinate system chosen) can be issued in addition.

As a rule, at least two recordings are made from one scene in order to obtain a complete three-dimensional data file in spite of inevitable shadings of portions of the scene by various objects positioned in it. In this way, it is advantageously possible to calculate vectors. In a first evaluation, at least two objects, e.g. traffic signs, masts, building roofs and so on, are marked in the different images as being identical. In a further run of image evaluation in the signal processing stage 12, the data of different recordings are combined to a single three-dimensional data file. Optionally, the set of differential data can be examined using given algorithms, e.g. stored in a memory of the evaluation unit 12 (e.g. the least squares method) for reducing the possibility of mistakes, a signal being released when a defined, preferably selectable, boundary value is exceeded.

When such a three-dimensional file exists, the scene, in a later evaluation, can be displayed turned at will (FIG. 3 at 37) for making various details visible. It is also possible to generate a plan view, e.g. by turning the vectors by computation, so that a site plan of a place of accident, preferably according to scale, is displayed on a screen or may be printed out, the distance of important points being optionally indicated in addition.

The invention is not limited to the embodiments described above. Instead of or in addition to the passive channel as an image information, the amplitude of the reflected laser pulses from the active channel can also be used. Since this image information is totally independent of the prevailing illumination conditions, it is preferably used as an image information when a whole scene or part of it is badly illuminated. Optionally the amplitude signals are superimposed to the signals of the passive channel.

In, order to elucidate the spatial depth of a luminance image still more clearly, a mock color distance image, known per se, can be superimposed to it, according to a further characteristic of the invention.

For improving the recording properties of the passive channel in darkness, an illumination source can be arranged either in the transmitter channel or in the receiver channel. Since the object space is also illuminated point-by point by the scanning arrangement, a very small power of the illumination source would be sufficient in this case.

If, upon recording, a considerably reflecting object, e.g. a wind screen or a puddle is aimed at, the surface normal of which including a more or less large angle, the receiver arrangement of the rangefinder will not receive any signal from such an object. Thus, a distance value from this object is missing. Such missing distance values can be determined by an interpolation procedure (FIG. 3 at 38) in the calculator 12 from the values of adjacent image elements so that even in such exceptional cases a complete set of data can be produced.

Figure 3:
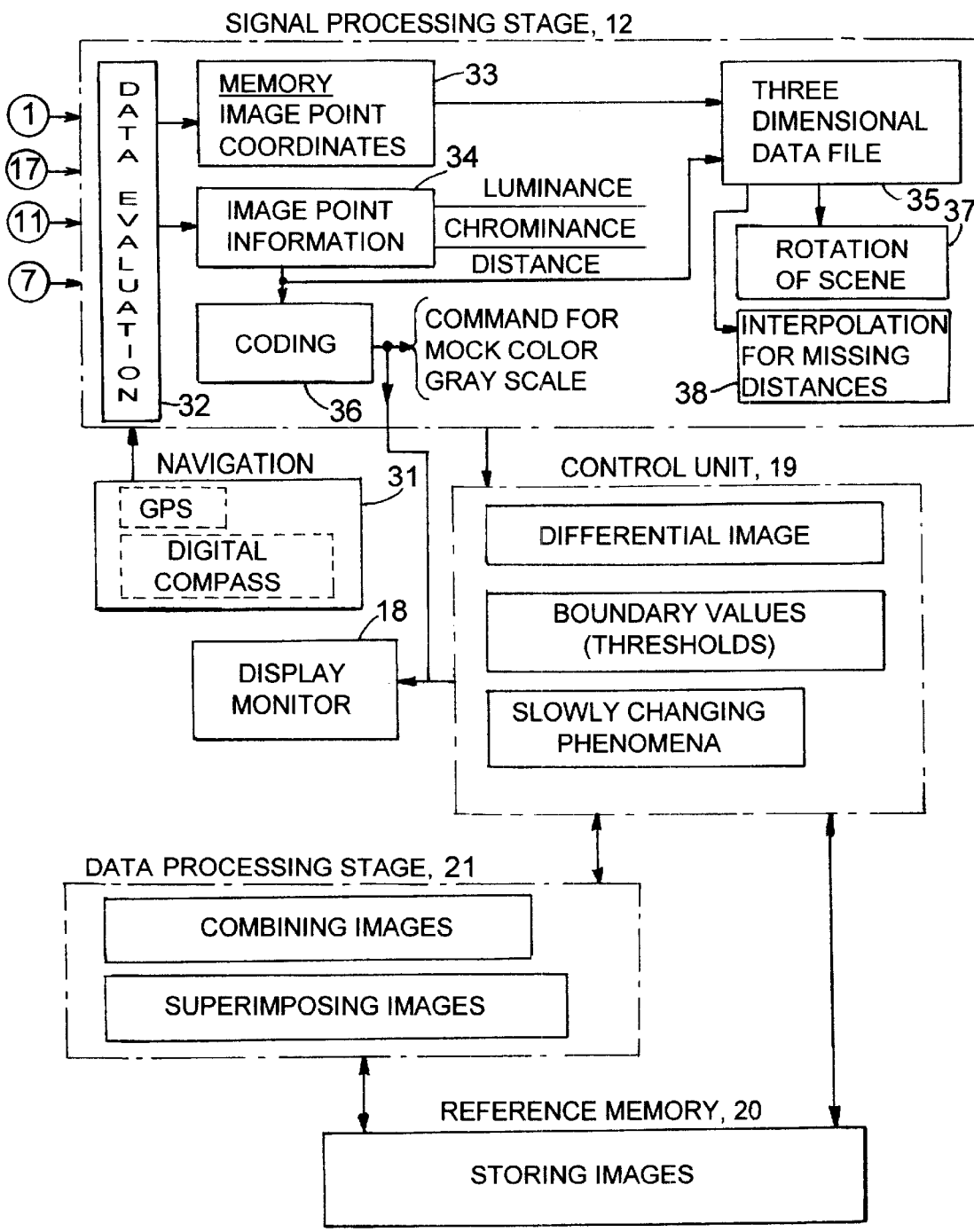
FIG. 3 is a block diagram showing further functions of the apparatus of FIG. 1.

The foregoing functions, described with reference to FIG. 1. are explained further with reference to the diagram of FIG. 3. Input signals are applied to the signal processing stage 12 from the components 1, 7, 11 and 17 set forth in FIG. 1. A further input signal to the signal processing stage 12 is provided by a navigation unit 31 having both a Global Positioning System (GPS) and a digital compass. The signal processing stage 12 evaluates data carried by the input signals at 32 to store angular coordinates of each of numerous points of an image in a memory 33. The data evaluation also results In image point information including luminance, chrominance and distance, indicated at 34. The distance and coordinates are employed to provide a three-dimensional data file at 35. The distance is also applied to a coding section 36 of the processing stage 12 to output signals which command the monitor 18 (FIG. 1) to present a mock color or gray scale to indicate range of a point in a displayed image.

In the control unit 19, there is provision for generation of a differential image from the data of two images, for determination of boundary values, or thresholds, between signal amplitudes, such as for determining suitable values of distance at which mock colors are established. Also, a routine for establishing a presentation of slowly changing phenomena, described above, is performed in the control unit 19. Operation of the control unit 19 employs information obtained from the signal processing stage 12. The data proceeding stage 21 provides the functions of combining images and of superimposing images, as shown in FIG. 3, with images being stored in the reference memory 20. The processing stage 21 and the memory 20 are connected to each other and the control unit 19 to provide for communication of data among these components.

Moreover, in addition to the applications mentioned above, the invention may generally be used for various measuring tasks, e.g. in construction engineering or in mechanical engineering. It may be used for controlling autonomous vehicles as well as a sensor in robotic systems. Mainly when used for measuring tasks in construction engineering it may be recommended to combine the installation with a navigation system, e.g. a GPS satellite navigation system, GPS, so that the coordinates of the different image points can be issued as geographical or GPS coordinates.

What is claimed is:

1. A method for recording an image of a target area using an optoelectronic rangefinder and a passive imaging device, wherein the rangefinder comprises:

transmission means for transmitting optical signals along a transmission axis, receiving means for receiving optical signals reflected by objects located in said target area in time-shifted relationship relative to said optical signals of the transmission means and along a receiving axis substantially parallel to said transmission axis, optical means mounted upstream of both said transmission means and said receiving means, and providing that the receiving axis is substantially parallel to the transmission axis, the optical means including scanning means for deflecting optical axes of said transmission means and said receiving means in different directions across said target area to obtain coordinates of points of the image, said optical means serving to provide a first spectral bandwidth to transmitted and received optical signals of said rangefinder, wherein the passive imaging device views said target area via said scanning means, said optical means providing said passive imaging device with a second spectral bandwidth;

wherein the method comprises steps of evaluating data obtained by said rangefinder based on information from said scanning means for determining distance values of the objects in the target area from said time-shifted relationship to provide signals representing distances of the points in the image, and reproducing individual image points according to data obtained by said rangefinder via said first spectral bandwidth and by said passive imaging device via said second spectral bandwidth, with the coordinates of said image points corresponding to a deflection of said scanning means, said second spectral bandwidth being greater than the first spectral bandwidth to improve clarity and presentation of the image.

2. Method as claimed in claim 1, wherein different directions of deflection of a beam by said scanning means comprise at least two orthogonal directions.

3. Method as claimed in claim 1, wherein said image reproducing step employs at least one monitor.

4. Method as claimed in claim 1, further comprising the following steps:

scanning said target area by said scanning means for a first time and evaluating signals reflected by the objects in said target area to obtain a first set of said data;

storing said first set of data as a set of reference data;

scanning said target area by said scanning means for at least a second time and evaluating signals reflected by the objects in said target area to obtain at least a second set of said data;

combining said at least second set of data with said first set of data to obtain differential amplitude for points of said image; and reproducing a combination of said data of said image points with said differential amplitude in the form of a combination image.

5. Method as claimed in claim 4, wherein said step of combining comprises superimposing said second set of data to said first set of data.

6. Method as claimed in claim 4, wherein said step of combining comprises a previous step of coding said data.

7. Method as claimed in claim 6, wherein said step of coding is effected in the form of mock colors.

8. Method as claimed in claim 7, wherein said step of reproducing comprises reproduction of an image in color coded form, the color hue representing a function of a distance difference between said first and second sets of data.

9. Method as claimed in claim 8, wherein said color coded form comprises mock colors as a code.

10. Method as claimed in claim 1, further comprising a step of transmitting laser signals by said rangefinder, wherein said transmission means include laser means for transmitting laser signals.

11. Method as claimed in claim 10, wherein said laser signals are in the form of pulses.

12. Method as claimed in claim 11, further comprising the step of deriving a series of at least one of received amplitude, luminance and chrominance signals, the latter two from a path of rays of at least one of said transmission means and said receiving means after said scanning means, to define said image therefrom.

13. Method as claimed in claim 12, wherein said distance image signals and signals of said passive imaging device are combined to form a combination image.

14. Method as claimed in claim 12, further comprising the following steps:

scanning said target area by said scanning means for a first time and evaluating signals reflected by the objects in said target area to obtain a first set of said data;

storing said first set of data as a set of reference data in a memory means;

scanning said target area by said scanning means for at least a second time and evaluating signals reflected by the objects in said target area to obtain at least a second set of said data;

combining said at least second set of data with said first set of data; and reproducing the combination of said first and second sets of data in the form of a first image; and forming a combination image by superimposing said first and second images.

15. Method as claimed in claim 14, wherein said memory means stores signals for a distance image and a second image, there being a further step of determining differential images from both said first and said second images to be reproduced.

16. Method as claimed in claim 13, further comprising the following steps:
  determining first spatial coordinates of a fixed point;
    determining second spatial coordinates of different selected image points;
    setting said first and second spatial coordinates into relationship to each other; and
    reproducing said relationship.

17. Method as claimed in claim 16, wherein the range finder operates with processing means adapted to rotate said spatial coordinates to provide an image seen from a different angle.

18. Method as claimed in claim 1, further comprising the step of interpolating a distance value, in case it is missing for an image point, from distance values of adjacent image points serving as a reference.

19. An apparatus for recording an image of a target area, comprising:
  an optoelectronic rangefinder which includes transmission means for transmitting optical signals along a transmission axis, at least one receiving means of a predetermined spectral sensitivity for receiving optical signals reflected by objects located in said target area in time-shifted relationship relative to said optical signals of the transmission means and along a receiving axis substantially parallel to said transmission axis,
  optical means mounted upstream of both said transmission means and said receiving means to define a path of rays, said optical means including at least one beam splitter for supplying part of said reflected optical signals to said at least one receiving means;
  a passive imaging device, and scanning means for deflecting said optical axes of said transmission means and said receiving means and an optical axis of said passive imaging device in various directions, wherein said range finder operates with a first spectral bandwidth to obtain range data of points within the target area, said imaging device operates with a second spectral bandwidth to obtain an image of points within the target area,
  evaluation means for determining distance values from said time-shifted relationship to provide the signals of a distance image, reproducing means for reproducing individual image points according to data obtained by said range finder via said first spectral bandwidth and by said passive imaging device via said second spectral bandwidth, the coordinates of said image points corresponding to deflection of said scanning means, said evaluation means serving for superposing range data upon the image data for points of the image, said second spectral bandwidth being greater than the first spectral bandwidth to improve clarity and presentation of the image.

20. Apparatus as claimed in claim 19, wherein said transmission means include laser means for transmitting laser signals.

21. Apparatus as claimed in claim 19, wherein said various directions of deflection comprise two directions orthogonal to each other.

22. Apparatus as claimed in claim 19, wherein said image reproducing means comprise at least one monitor.

23. Apparatus as claimed in claim 19, further comprising color filter means situated between said beam splitter and said at least one receiving means for providing a designated spectral sensitivity to said receiving means.

24. Apparatus as claimed in claim 19, further comprising image amplifier means assigned to said receiving means for increasing the sensitivity.

25. Apparatus as claimed in claim 19, further comprising compass means connected to said evaluation means for defining a coordinate system in relation to a fixed point as a reference to said measured distance values.

26. Apparatus as claimed in claim 25, wherein said fixed point is the actual position of said optoelectronic rangefinder.

27. Apparatus as claimed in claim 25, wherein said compass means comprise a digital compass.

28. Apparatus as claimed in claim 19, further comprising navigation means for determining the position of said optoelectronic rangefinder as a reference to said measured distance values.

29. Apparatus as claimed in claim 28, wherein said navigation means comprise a GPS system.

30. A method for presenting an image of a subject by use of an optoelectronic rangefinder and a passive imaging device, comprising the steps of:
  providing the range finder and the imaging device with a scanner;
  operating the range finder with a scanning of the subject by a beam having a first spectral bandwidth to obtain range data of points within the subject;
  operating the passive imaging device with a scanning of the subject in a second spectral bandwidth to obtain an image with image data of points within the subject;
  superposing range data upon the image data for points of the image; and
  wherein the second spectral bandwidth is greater than the first spectral bandwidth to improve clarity and presentation of the image.

31. Method as claimed in claim 30, wherein said scanner deflects optical axes of said transmission means and said receiving means and an optical axis of said passive imaging device in different directions across said subject, and said different directions of deflection comprise at least two orthogonal directions.

32. Method as claimed in claim 30, further comprising a step of presenting said image by use of an image reproducing means comprising at least one monitor.

33. Method as claimed in claim 30, including a step of spectrally filtering signals received in an active channel of said range finder from signals received in a passive channel of the imaging device.

34. A method according to claim 30, wherein the second spectral bandwidth is in the visible spectrum.

35. A method according to claim 30, wherein the first spectral bandwidth is in the infrared spectrum.

36. A method as claimed in claim 30, wherein said scanning is accomplished by means of a scanner optically coupled to said range finder and said passive imaging device, the method further comprising steps of:
  reproducing individual image points with the coordinates of said image points corresponding to a deflection of said scanner, storing said image points, determining a descriptive parameter from said range data, and assigning the descriptive parameter to respective ones of the image points, and describing the image in terms of descriptive parameters obtained from data of both said range finder and said passive imaging device.

37. Method as claimed in claim 36, including a step of spectrally filtering signals received in an active channel of said range finder from signals received in a passive channel of the imaging device.

38. A method for presenting an image of a subject by use of an optoelectronic rangefinder and a passive imaging device, comprising the steps of:

providing the range finder and the imaging device with a scanner;

operating the range finder with a scanning of the subject by a beam having a first spectral bandwidth to obtain range data of points within the subject;

operating the passive imaging device with a scanning of the subject in a second spectral bandwidth to obtain an image with image data of points within the subject;

superposing range data upon the image data for points of the image; and wherein the second spectral bandwidth differs from the first spectral bandwidth.

39. A method according to claim 38, wherein the second spectral bandwidth comprises the infrared spectrum.

\* \* \* \* \*